(12) United States Patent
Grützmacher et al.

(10) Patent No.: US 10,889,603 B2
(45) Date of Patent: Jan. 12, 2021

(54) VERSATILE PROCESS FOR THE PREPARATION OF ACYLPHOSPHINES

(71) Applicants: ETH ZÜRICH, Zürich (CH); THE UNIVERSITY OF BRISTOL, Bristol (GB)

(72) Inventors: Hansjörg Grützmacher, Dielsdorf (CH); Paul Gerard Pringle, Somerset (GB); Mark Bispinghoff, Zürich (CH)

(73) Assignees: ETH ZÜRICH, Zurich (CH); THE UNIVERSITY OF BRISTOL, Bristol (GB)

( * ) Notice: Subject to any disclaimer, the term of this patent is extended or adjusted under 35 U.S.C. 154(b) by 0 days.

(21) Appl. No.: 16/334,668

(22) PCT Filed: Sep. 18, 2017

(86) PCT No.: PCT/EP2017/073525
§ 371 (c)(1),
(2) Date: Mar. 19, 2019

(87) PCT Pub. No.: WO2018/050901
PCT Pub. Date: Mar. 22, 2018

(65) Prior Publication Data
US 2019/0382424 A1 Dec. 19, 2019

(30) Foreign Application Priority Data
Sep. 19, 2016 (EP) .................................. 16189549

(51) Int. Cl.
*C07F 9/50* (2006.01)
(52) U.S. Cl.
CPC .................. *C07F 9/5036* (2013.01)
(58) Field of Classification Search
None
See application file for complete search history.

(56) References Cited

U.S. PATENT DOCUMENTS

2015/0299231 A1   10/2015   Gruetzmacher et al.

FOREIGN PATENT DOCUMENTS

| EP | 1135399 B1 * | 8/2002 | ............ C07F 9/5337 |
|----|----|----|----|
| JP | 2009-536681 A | 10/2009 | |
| WO | 008/32612 A1 | 6/2000 | |
| WO | 2005/014605 A1 | 2/2005 | |
| WO | 2006/056541 A1 | 6/2006 | |
| WO | 2006/074983 A1 | 7/2006 | |
| WO | 2007133523 A2 | 11/2007 | |
| WO | 2010/121387 A1 | 10/2010 | |
| WO | 2011/003772 A1 | 1/2011 | |
| WO | 2014/053455 A1 | 4/2014 | |

OTHER PUBLICATIONS

Laali, Kenneth K. et al., "Electrophilic Chemistry of Tetraphosphacubane: Novel Monophosphonium Ions of Ethylation, Benzylation, Acylation, and Adamantylation, Di- and Triphosphonium Ions of Acylation/Alkylation and Alkylation/Protonation, and Monoprotonation of Tetraoxo- and Tetrathioxotetraphosphacubane", J. Org. Chem., vol. 60, pp. 47-52, (1995).
Albers, Henry et al., "Zur Kenntnis der acylierten Arsenwasserstoff- und Phosphorwasserstoff-Derivate und der Isoarsile", No. 3, pp. 239-249, (1952).
Issleib, Kurt et al., "Darstellung und Charakterisierung disubstituierter Saurephosphide", Chemische Berichte, vol. 92, pp. 3183-3189, (1959).
Becker, Von G., "Triacetylphosphan aus Tris(trimethylsilyl)phosphan", Z. Anorg. Allg. Chem., vol. 480, pp. 21-37, (1981).
Becker, Von G., "Verbindungen aus der Reaktion von Tris(trimethylsilyl)phosphin mit Pivaloylchlorid", Z. Anorg. Allg. Chem., vol. 430, pp. 66-76, (1977).
Becker, Von G. et al., "Bis(2,2-dimethylpropionyl)phosphan und Bis(2,2-dimethylpropionyl)phosphide", Z. Anorg. Allg. Chem., vol. 495, pp. 73-88, (1982).
Becker, G. et al., "Bis(2,4,6-trimethylbenzoyl)phosphan und—arsan—Synthese und Struktur", Z. Anorg. Allg. Chem., vol. 605, pp. 7-23, (1991).
Markl, G et al., "Di-[ (2,4,6-Tri-Tert-Butyl)-Benzoyl]-Phosphan, Di-[ (2,4,6-Tri-Tert-Butyl)-Benzoyl]-Arsan-Keto-Enol-Tautomerie", Tetrahedron Letters,vol. 27, No. 16, pp. 1771-1774, (1986).
Ionkin, A. S. et al., "Diphenylboryldipivaloylphosphide—The First Example of Borylated 2-Phospha-1,3-Dionate", Phosphorus, Sulfur, and Silicon and the Related Elements, vol. 55: 1-4, pp. 133-136, 1991.
Nöth, Heinrich et al., "Reactions of Monomeric Phosphanylboranes with Acyl Chlorides:1 -Oxa-3-oxonia-5-phospha-2-borata-3,5-cyclohexadienes", Chem. Ber., vol. 225, pp. 1923-1926, Apr. 2, 1994.
Evans, P. N. et al., "Preparation of Benzophosphide", Am. Chem. J., vol. 44, pp. 362-365, (1910).
Tyka, R. et al., "Über Triaroylphosphide", Acad. Pol. Sci. Chim., vol. 9, pp. 577-584, (1961).
Dec. 21, 2017 Search Report issued in International Patent Application No. PCT/EP2017/073525.
Cicač-Hudi, Mario et al., "Direct Access to Inversely Polarized Phosphaalkenes from Elemental Phosphorus or Polyphosphides", Eur. J. Inorg. Chem., vol. 5, pp. 649-658, (2016).
Dec. 21, 2017 Written Opinion issued in International Patent Application No. PCT/EP2017/073525.
Becker, V. et al., "Syntheses and Properties of Acylphosphines. IV. Molecular and Crystal Structure of Aluminum-tris(dibenzoylphosphide)", Z. Anorg. Allg. Chem., vol. 430, pp. 91-109, (1977).

(Continued)

*Primary Examiner* — Clinton A Brooks
*Assistant Examiner* — Kofi Adzamli
(74) *Attorney, Agent, or Firm* — Oliff PLC

(57) ABSTRACT

A versatile, highly efficient process for the preparation of acylphosphines such as mono- and bisacylphosphines via reaction of phosphines ($PH_3$ and higher homologues) or silylated phosphines with acylhalides in the presence of at least one lewis acid. Further a novel acyl phosphines obtainable by the process.

16 Claims, No Drawings

(56) References Cited

OTHER PUBLICATIONS

Weber, L. et al. "Transition-Metal-Substituted Acylphosphines and Phosphaalkenes. XI. Phosphaalkenyl-, Disilylphosphido-, and Diacylphosphido- Complexes of Dicarbonyl(pentamethylcyclopentadienyl)osmium. Study of [(η5—C5Me5)Os(CO)2]2", Journal of Organometallic Chemistry, vol. 311, pp. 269-280, (1986).

Madadi, M. et al. "NHC-Stabilized Bis(trimethylsilyl)phosphido Complexes of Pd11 and Ni11", European Journal of Inorganic Chemistry, vol. 2015(19), pp. 3094-3101, (2015).

Weber, L. et al. "Synthesis and Structure of (C5Me5)(CO)2RuP[C(O)(t-Bu)]2, the First Diacylphosphido Complex with Metal-Phosphorus Coordination", Organometallics, vol. 4, pp. 1890-1891, (1985).

Ionkin, A. et al. "Synthesis, Structural Characterization, and Initial Electroluminescent Properties of bis-cycloiridiated Complexes of 2-(3,5-bis(trifluoromethyl)phenyl)-4-methylpyridine", Journal of Organometallic Chemistry, vol. 692, pp. 4809-4827, (2007).

Nief, F. et al. "Reactions of (phosphine)pentacarbonyltungsten. Synthesis of Primary and Secondary Phosphines in the Coordination Sphere of Tungsten", Journal of Organometallic Chemistry, vol. 328, pp. 349-355, (1987).

Manzoni De Oliveira, G., et al. "Reactions of Cp'(CO)2MnPPh2H with CH3COCl and CH3S(O)2Cl in THF/triethylamine: Evidence of the First Complex Stabilization of a Phosphorus Homolog of the Sulfonamides", Inorganica Chimica Acta, vol. 288, pp. 101-105, (1999).

Sep. 8, 2020 Office Action issued in Japanese Patent Appliction No. 2019-515525.

* cited by examiner

VERSATILE PROCESS FOR THE PREPARATION OF ACYLPHOSPHINES

The present invention relates to a versatile, highly efficient process for the preparation of acylphosphines such as mono- and bisacylphosphines via reaction of phosphines (PH$_3$ and higher homologues) or silylated phosphines with acylhalides in the presence of at least one lewis acid. The invention further relates to novel acyl phosphines obtainable by said process.

Photoinitiators, in particular mono- and bisacylphosphine oxides, in particular those bearing further functionalized substituents have attracted significant commercial attention since photoinitiators which are tunable with respect to the wavelength at which photoinduced cleavage occurs or which are linkable to other additives, such as sensitizers, stabilizers or surface active agents are highly desirable.

Industrial applications of mono- and bisacylphosphine oxides include the manufacture of pigmented and clear coatings, adhesives, inks, photo-resists, printing plates, and dental restoring materials.

However, the synthesis of mono- and bisacylphosphines as standard precursor materials for the corresponding oxides requires the use of highly reactive phosphanes and is thus difficult to manage at industrial scale. Specifically, for known synthesis of bisacylphosphines, hazardous chemicals such as primary phosphanes, RPH$_2$, are used.

Moreover, this approach does not allow to attach functional groups other than simple alkyl or aryl groups as group R to the phosphorus center.

At present, the only industrially viable route to substituted bisacylphosphines requires as a first step the synthesis of bisacylphosphines, HP(COR)$_2$ as intermediates which are obtained by acylation of a metal dihydrogenphosphide M(PH$_2$). M(PH$_2$) can be obtained from elemental phosphorus by reaction with a strongly reducing metal such as lithium, sodium, or potassium, and catalytic amounts of naphthalene, followed by protonation of the resulting trisodium phosphide (Na$_3$P) with tert-butanol (see WO2006/056541A).

The resulting bisacylphosphines, HP(COR)$_2$ may then be further reacted with functionalized halo compounds (WO2006/056541A) or even with acrylates or other electrophiles as disclosed in WO2014/053455A to obtain functionalized bisacylphosphines RP(COR)$_2$ which are then converted to the corresponding bisacylphosphine oxides O=PR(COR)$_2$ by simple oxidation. Similar reaction sequences are disclosed in WO2010/121387A and WO2011/003772A.

Alternatively, EP 1 135 399 A discloses a process for the preparation of mono- and bisacylphosphines and their respective oxides and sulfides. The process comprises the steps of reacting substituted monohalophosphanes or dihalophosphanes with an alkali metal or a combination of magnesium and lithium, where appropriate in the presence of a catalyst, further reacting the resulting metallated phosphanes with carboxylic acid halides and finally oxidizing the resulting mono- or bisacylphosphines with sulfur or oxygen transferring oxidants.

It is further known from WO05/014605A to prepare substituted bisacylphosphines via a process comprising the steps of first reacting monohalophosphanes or dihalophosphanes with an alkali metal in a solvent in the presence of a proton source and then reacting the phosphanes obtained thereby with carboxylic acid halides.

WO2006/074983A discloses a process for the preparation of bisacylphosphines by first catalytically reducing monochloro- or dichlorophosphines with hydrogen at a temperature of from 20 to 200° C. under pressure in the presence of a tertiary aliphatic amine or an aromatic amine in an aprotic solvent to obtain the corresponding halogen-free phosphanes and subsequently reacting said phosphanes with carboxylic acid halides to obtain mono- or bisacylphosphines.

However, for the variation of the non-acyl substituent(s) at the phosphorous atom the aforementioned processes, even though some of them can be performed as a one-pot procedure either require
- the initial employment of an organic mono- or dihalophosphane already bearing such substituent(s) in a first reduction or metallation step which significantly diminishes the variability of possible substitution patterns, or
- if e.g. alkali metal phosphides such as Na$_3$P or NaPH$_2$ are employed, handling of elemental phosphorus and a strongly reducing alkali metals which renders such processes commercially less attractive.

Attempts to prepare mono- or bisacylphosphanes (H$_2$P(COR) and HP(COR)$_2$ directly from readily available phosphine (PH$_3$) have failed so far.

Albers et al. attempted the acylation of PH$_3$ with acetyl chloride in the presence of AlCl$_3$, but were not able to isolate any products (H. Albers, W. Künzel, W. Schuler, Chem. Ber. 1952, 85, 239-249). Issleib likewise reports failure to prepare acylphosphanes from PH$_3$ and various acylhalides (K. Issleib, E. Priebe, Chemische Berichte 1959, 92, 3183). This was later confirmed by Becker et al. In: G. Becker, Zeitschrift für Anorganische und Allgemeine Chemie 1981, 480, 21.

Evans et al. prepared benzoylphosphine by bubbling PH$_3$ through neat benzoylchloride, albeit in very low yield (P. N. Evans, J. Tilt, Am. Chem. J. 1910, 44, 362). Platzek et al. prepared tris(acyl)phosphines by treating solutions of acid chlorides in pyridine with PH$_3$ (R. Tyka, E. Plazek, Bulletin de l'Academie Polonaise des Sciences, Serie des Sciences Chimiques 1961, 9, 577-584). Due to the numerous possible side reactions, the products obtained are of low purity and thus not suitable to be industrially employed.

The acylation of silylphosphines has been reported (G. Becker, Zeitschrift für Anorganische und Allgemeine Chemie 1981, 480, 38; G. Becker, H. P. Beck, Zeitschrift für Anorganische und Allgemeine Chemie 1977, 430, 77; G. Becker, M. Rössler, G. Uhl, Zeitschrift für Anorganische und Allgemeine Chemie 1982, 495, 73; G. Becker, W. Becker, M. Schmidt, W. Schwarz, M. Westerhausen, Zeitschrift für Anorganische und Allgemeine Chemie 1991, 605, 7; G. Märkl, H. Sejpka, Tetrahedron Letters 1986, 27, 1771; A. S. Ionkin, L. F. Chertanova, B. A. Arbuzov, Phosphorus, Sulfur and Silicon and the Related Elements 1991, 55, 133-136 wherein the compound diphenylborylpivaloylphosphide is explicitly mentioned; H. Nöth, S. Staude, M. Thomann, J. Kroner, R. T. Paine, Chemische Berichte 1994, 127, 1923).

The acylation of polyphosphides or polyphosphines has not been reported to date.

As a consequence, and in view of the restrictions described above there is still a need for a highly efficient and versatile process to prepare acylphosphines, in particular mono- or bisacylphosphines.

A process was now found for the preparation of compounds of formula (I):

$$[LAF]_s[P_x(R^H)_m(R^1)_n(COR^2)_p]_q \qquad (I)$$

wherein
s is either 0 or, provided that x is 1, m and n are 0 and p is 2, s is 1
q if s is 0, is 1 and
  if s is 1, is an integer of 1 to 5, preferably 1, 2 or 3, more preferably 1 or 3
x is an integer of 1 to 15 or 20
m, n and p are selected such that:
  m is zero or an integer of 1 or more
  n is zero or an integer of 1 or more
  P is an integer of 1 or more
  and one of the following conditions is met:

| If | x is an integer of 1 to 9 | (m+n+p) is (x+2) where s is 0<br>(m+n+p) is (x+1) where s is 1 |
|----|---------------------------|---------------------------------------------------------------|
|    | x is an integer of 3 to 10 | (m+n+p) is x |
|    | x is an integer of 4 to 12 | (m+n+p) is (x−2) |
|    | x is an integer of 5 to 10 or 13 | (m+n+p) is (x−4) |
|    | x is an integer of 7 to 14 | (n+m+p) is (x−6) |
|    | x is 10, 11 or 15 | (m+n+p) is (x−8) |
|    | x = is 12 or 20 | (m+n+p) is (x−10) |

LAF represents a q-valent Lewis Acid Fragment (LAF) as defined hereinafter,
$R^H$ are independently of each other either
  hydrogen,
  or a residue of formula $Si(R^3)_3$, wherein the substituents $R^3$ are independently of each other selected from the group consisting of $C_1$-$C_{18}$-alkyl and $C_6$-$C_{14}$-aryl
$R^1$ and $R^2$ are independently of each other aryl or heterocyclyl, alkyl or alkenyl
  whereby the aforementioned alkyl and alkenyl substituents $R^1$ and/or $R^2$ are
    either not, once, twice or more than twice interrupted by non-successive functional groups selected from the group consisting of:
      —O—, —NR$^4$—, —CO—, —OCO—, —O(CO)O—, NR$^4$(CO)—, —NR$^4$(CO)O—, O(CO)NR$^4$—, —NR$^4$(CO)NR$^4$—,
    and
    either not, additionally or alternatively either once, twice or more than twice interrupted by bivalent residues selected from the group consisting of heterocyclo-diyl, and aryldiyl,
    and
    either not, additionally or alternatively either once, twice or more than twice substituted by substituents selected from the group consisting of:
      oxo, halogen, cyano, $C_6$-$C_{14}$-aryl; heterocyclyl, $C_1$-$C_8$-alkoxy, $C_1$-$C_8$-alkylthio, —SO$_2$N(R$^4$)$_2$, —NR$^4$SO$_2$R$^5$, —N(R$^4$)$_2$—, —CO$_2$N(R$^4$)$_2$, —COR$^4$—, —OCOR$^5$, —O(CO)OR$^5$, NR$^4$(CO)R$^4$, —NR$^4$(CO)OR$^4$, O(CO)N(R$^4$)$_2$, —NR$^4$(CO)N(R$^4$)$_2$,
whereby in all formulae where used
$R^4$ is independently selected from the group consisting of hydrogen, $C_1$-$C_8$-alkyl, $C_6$-$C_{14}$-aryl, and heterocyclyl or N(R$^4$)$_2$ as a whole is a N-containing heterocycle,
$R^5$ is independently selected from the group consisting of $C_1$-$C_8$-alkyl, $C_6$-$C_{14}$-aryl, and heterocyclyl or N(R$^5$)$_2$ as a whole is a N-containing heterocycle
the process comprising at least the step of reacting compounds of formula (II)

$$P_x(R^H)_{(m+p)}(R^1)_n \qquad (II)$$

wherein $R^H$, $R^1$, x, and n and the sum of (m+n+p) is as defined above for the sum of (m+n+p) for compounds of formula (I) with s being 0 where x=1
and the sum of (m+p) is an integer of 1 or more that fits the equation given for the sum of (m+n+p) for compounds of formula (I) with s being 0 where x is 1
with compounds (carboxylic acid halides) of formula (III),

$$R^2COHal \qquad (III)$$

wherein $R^2$ is as defined above for compounds of formula (I) and
Hal represents fluoro, chloro, bromo or iodo, preferably chloro or bromo and even more preferably chloro
whereby the reaction is carried out in the presence of at least one lewis acid.

The scope of the invention encompasses all combinations of substituent definitions, parameters and illustrations set forth above and below, either in general or within areas of preference or preferred embodiments, with one another, i.e., also any combinations between the particular areas and areas of preference.

Whenever used herein the terms "including", "e.g.", "such as" and "like" are meant in the sense of "including but without being limited to" or "for example without limitation", respectively.

As used herein, and unless specifically stated otherwise, aryl denotes carbocyclic aromatic substituents, whereby said carbocyclic, aromatic substituents are unsubstituted or substituted by up to five identical or different substituents per cycle. For example and with preference, the substituents are selected from the group consisting of fluorine, bromine, chlorine, iodine, nitro, cyano, $C_1$-$C_8$-alkyl, $C_1$-$C_8$-haloalkyl, $C_1$-$C_8$-alkoxy, $C_1$-$C_8$-haloalkoxy, protected hydroxyl, protected formyl, $C_6$-$C_{14}$-aryl such as phenyl and naphthyl, di($C_1$-$C_8$-alkyl)amino, ($C_1$-$C_8$-alkyl)amino, CO($C_1$-$C_8$-alkyl), OCO($C_1$-$C_8$-alkyl), NHCO($C_1$-$C_8$-alkyl), N($C_1$-$C_8$-alkyl)CO($C_1$-$C_8$-alkyl), CO($C_6$-$C_{14}$-aryl), OCO($C_6$-$C_{14}$-aryl), NHCO($C_6$-$C_{14}$-aryl), N($C_1$-$C_8$-alkyl)CO($C_6$-$C_{14}$-aryl), COO—($C_1$-$C_8$-alkyl), COO—($C_6$-$C_{14}$-aryl), CON($C_1$-$C_8$-alkyl)$_2$ or CONH($C_1$-$C_8$-alkyl), CONH$_2$, SO$_2$NH$_2$ or SO$_2$N($C_1$-$C_8$-alkyl)$_2$.

In a preferred embodiment, the carbocyclic, aromatic substituents are unsubstituted or substituted by up to three identical or different substituents per cycle selected from the group consisting of fluorine, chlorine, $C_1$-$C_8$-alkyl, $C_1$-$C_8$-fluoro alkyl, $C_1$-$C_8$-alkoxy, $C_1$-$C_8$-haloalkoxy, $C_6$-$C_{14}$-aryl such as phenyl.

In a more preferred embodiment, the carbocyclic, aromatic substituents are unsubstituted or substituted by up to three identical or different substituents per cycle selected from the group consisting of fluorine, chlorine, $C_1$-$C_4$-alkyl, $C_1$-$C_4$-perfluoro alkyl, $C_1$-$C_4$-alkoxy, $C_1$-$C_4$-perfluoroalkoxy and phenyl.

Terms such as $C_6$-$C_{14}$ aryl indicate that the number of carbon atoms of the respective carbocyclic, aromatic ring system is from 6 to 14 and does not take the carbon atoms of potential substituents into account.

As used herein and unless specifically stated otherwise, heterocyclyl denotes heterocyclic aliphatic, aromatic or mixed aliphatic and aromatic substituents in which no, one, two or three skeleton atoms per cycle, but at least one skeleton atom in the entire cyclic system is a heteroatom selected from the group consisting of nitrogen, sulphur and oxygen which are unsubstituted or substituted by up to five identical or different substituents per cycle, whereby the substituents are selected from the same group as given above for carbocyclic aromatic substituents including the areas of preference.

Preferred heterocyclyl-substituents and heteroaryl-substituents respectively are pyridinyl, oxazolyl, thiophen-yl, benzofuranyl, benzothiophen-yl, dibenzofuranyl, dibenzothiophenyl, furanyl, indolyl, pyridazinyl, pyrazinyl, imidazolyl, pyrimidinyl and quinolinyl, either unsubstituted or substituted with one, two or three substituents selected from the group consisting of fluorine, $C_1$-$C_8$-alkyl, $C_1$-$C_8$-perfluoro alkyl, $C_1$-$C_8$-alkoxy, $C_1$-$C_8$-perfluoroalkoxy, and phenyl.

As used herein, and unless specifically stated otherwise, protected formyl is a formyl substituent which is protected by conversion to an aminal, acetal or a mixed aminal acetal, whereby the aminals, acetals and mixed aminal acetals are either acyclic or cyclic.

For example, and with preference, protected formyl is 1,1-(2,4-dioxycyclopentanediyl).

As used herein, and unless specifically stated otherwise, protected hydroxyl is a hydroxyl radical which is protected by conversion to a ketal, acetal or a mixed aminal acetal, whereby the aminals, acetals and mixed aminal acetals are either acyclic or cyclic. A specific example of protected hydroxyl is tetrahydropyranyl (O-THP).

As used herein, and unless specifically stated otherwise, alkyl and alkenyl are straight-chained, cyclic either in part or as a whole, branched or unbranched.

The term $C_1$-$C_{18}$-alkyl indicates that the straight-chained, cyclic either in part or as a whole, branched or unbranched alkyl substituent contains from 1 to 18 carbon atoms excluding the carbon atoms of optionally present substituents to the $C_1$-$C_{18}$-alkyl substituent. The same analogously applies to alkenyl and further substituents having a different indicated number or range of carbon atoms if not explicitly stated otherwise.

For the avoidance of doubt the term alkenyl denotes a substituent comprising at least one carbon-carbon double bond, irrespective of its location within the straight-chained, cyclic either in part or as a whole, branched or unbranched substituent.

Specific examples of $C_1$-$C_4$-alkyl are methyl, ethyl, n-propyl, isopropyl, n-butyl, tert-butyl. Additional examples for $C_1$-$C_8$-alkyl are n-pentyl, cyclohexyl, n-hexyl, n-heptyl, n-octyl, isooctyl. Additional examples for $C_1$-$C_{18}$-alkyl are norbornyl, adamantyl, n-decyl, n-dodecyl, n-hexadecyl, n-octadecyl.

Specific examples of $C_1$-$C_4$-alkoxy-substituents are methoxy, ethoxy, isopropoxy, n-propoxy, n-butoxy and tert-butoxy. An additional example for $C_1$-$C_8$-alkoxy is cyclohexyloxy.

Specific examples of $C_2$-$C_{18}$-alkenyl and $C_2$-$C_8$-alkenyl-substituents are allyl, 3-propenyl and buten-2-yl.

As used hereinabove, $C_1$-$C_8$-haloalkyl and $C_1$-$C_8$-haloalkoxy are $C_1$-$C_8$-alkyl and $C_1$-$C_8$-alkoxy substituents which are once, more than once or fully substituted by halogen atoms. Substituents which are fully substituted by fluorine are referred to as $C_1$-$C_8$-perfluoroalkyl and $C_1$-$C_8$-perfluoroalkoxy, respectively.

Specific examples of $C_1$-$C_8$-haloalkyl-substituents are trifluoromethyl, 2,2,2-trifluoroethyl, chloromethyl, fluoromethyl, bromomethyl, 2-bromoethyl, 2-chloroethyl, nonafluorobutyl and n-perfluorooctyl.

The process according to the invention requires employment of compounds of formulae (II) and (III). Such compounds are commercially available or may be prepared by published procedures.

In one embodiment
$R^1$ and $R^2$ are independently of each other aryl, alkyl or alkenyl
whereby the aforementioned alkyl and alkenyl substituents $R^1$ and/or $R^2$ are
either not, once, twice or more than twice interrupted by non-successive functional groups selected from the group consisting of:
—O—, —CO—, —NR$^4$(CO)—,
and
either not, additionally or alternatively either once, twice or more than twice interrupted by bivalent residues selected from the group consisting of aryldiyl,
and
either not, additionally or alternatively either once, twice or more than twice substituted by substituents selected from the group consisting of:
oxo, fluoro, $C_6$-$C_{14}$-aryl; $C_1$-$C_8$-alkoxy, —SO$_2$N(R$^4$)$_2$, —NR$^4$SO$_2$R$^5$, —CO$_2$N(R$^4$)$_2$, —COR$^4$—,
whereby in all formulae where used
$R^4$ is independently selected from the group consisting of hydrogen, $C_1$-$C_8$-alkyl, $C_6$-$C_{14}$-aryl or N(R$^4$)$_2$ as a whole is a N-containing heterocycle,
$R^5$ is independently selected from the group consisting of $C_1$-$C_8$-alkyl, $C_6$-$C_{14}$-aryl or N(R$^5$)$_2$ as a whole is a N-containing heterocycle.

In one embodiment in compounds of formulae (I) and (II)
$R^1$ is $C_6$-$C_{14}$-aryl, $C_4$-$C_{13}$-heteroaryl or $C_1$-$C_{18}$-alkyl, preferably $C_6$-$C_{14}$-aryl, more preferably phenyl.

In one embodiment in compounds of formulae (I) and (III)
$R^2$ is $C_6$-$C_{14}$-aryl or $C_4$-$C_{13}$-heteroaryl, preferably $C_6$-$C_{14}$-aryl, more preferably phenyl, mesityl or 2,6-dimethoxyphenyl or naphthyl, and even more preferably phenyl or mesityl or naphthyl, whereby phenyl or mesityl are even more preferred.

In one embodiment in compounds of formulae (I) and (II)
$R^H$ is hydrogen or trimethylsilyl, whereby hydrogen is preferred.

In one embodiment in compounds of formulae (I) and (II)
LAF provided that s and x are 1, m is 0 and p is 2, is a q-valent Lewis Acid
Fragment (LAF) as defined hereinafter including the preferred embodiments for q and the Lewis Acids.

In one preferred embodiment in compounds of formulae (I) and (II)
n is 0

In one preferred embodiment in compounds of formulae (I) and (II)
x is 1 or 7 and
n is 0
(m+n+p) and thus (m+p) is 3 and
where x is 1 additionally s is 1 and thus (s+m+n+p) is 3 and (m+p) is 2.

In this embodiment in compounds of formula (I)
p is 1 or 2 if x is 1 and is 3 if x is 7 and
m is 1 or 2 if x is 1, and is 0 if x is 7.

Specific compounds of formula (II) include phosphine (PH$_3$), tris(trimethylsilyl)phosphine (P(SiMe)$_3$) and tris (trimethylsilyl)-heptaphosphine ((P$_7$(SiMe)$_3$), whereby phosphine is preferred.

Specific compounds of formula (I) include benzoylphosphine, mesitoylphosphine, naphthoylphosphine, bismesitoylphosphine, dibenzoylphosphine, bisnaphthoylphosphine, dichloroaluminyl-bismesitoylphosphide, difluoroboryl-bismesitoylphosphide, dichloroaluminyl-bisbenzoylphosphide, difluoroboryl-bisbenzoylphosphide, chloroaluminyl-bis(bismesitoylphosphide), chloroaluminyl-bis(bisbenzoyl-phosphide), chloroboryl-bis(bismesitoylphosphide), chloroboryl-bis(bisbenzoyl-phosphide), aluminium-tris(bismesitoylphosphide), aluminium-tris(bisnaphthoylphosphide) and/or aluminium-tris(bisbenzoylphosphide).

Specific compounds of formula (III) include naphthoylchloride, benzoylchloride and mesitoylchloride, whereby benzoylchloride and mesitoylchloride are preferred.

It is known to those skilled in the art that compounds of formula (I) in particular those comprising a LAF might form oligomers such as dimers or trimers in solution or solid state depending on solvent or other conditions. These oligomers shall be encompassed by the invention and the respective formulae.

The process according to the invention is carried out in the presence of at least one Lewis acid.

The term "Lewis acid" in the context of the invention is understood to mean the generally customary definition of those compounds which have an electron vacancy, as explained, for example, in Römpp's Chemie-Lexikon, 8$^{th}$ edition, Franck'sche Verlagshandlung 1983, Volume 3, H-L.

In a preferred embodiment the at least one Lewis acid is selected from the group including methyl aluminoxane (MAO) and compounds represented by formula (IV)

$$MR^L{}_{(r)}X_{(z-r)} \qquad (IV)$$

wherein
z is 2, 3, 4 or 5
r is 0 or an integer of at maximum z, preferably 0, 1 or 2, more preferably 0 or 1 and even more preferably 0

| | | |
|---|---|---|
| M | if z is 2 | is Sn or in another embodiment Sn, Fe, Mn and Zn |
| | if z is 3 | is an element selected from the group consisting of Sc, Y, La, Ce, Pr, Nd, Sm, Eu, Gd, Tb, Dy, Ho, Er, Tm, Yb, Lu, Fe, B, Al, Ga, In, As |
| | if z is 4 | is an element selected from the group consisting of V, Ti, Zr, Hf, Sn |
| | if z is 5 | is an element selected from the group consisting of V, P, As, Sb, Bi |

X is independently selected from the group consisting of fluoride, chloride, bromide, iodide, azide, isocyanate, thiocyanate, isothiocyanate or cyanide, preferably fluoro, chloro or bromo, more preferably fluoro or chloro
$R^L$ represents $C_1$-$C_{18}$-alkyl, cyclopentadienyl, $C_1$-$C_{18}$-haloalkyl, $C_1$-$C_{18}$-alkoxy, $C_1$-$C_{18}$-haloalkoxy, $C_6$-$C_{14}$-aryl, $C_7$-$C_{18}$-arylalkyl, $C_6$-$C_{14}$-aryloxy, $C_7$-$C_{18}$-arylalkoxy, —O(HC=O), —O(C=O)—($C_1$-$C_{18}$-alkyl), —O(C=O)—($C_6$-$C_{14}$-aryl) and —O(C=O)—($C_7$-$C_{18}$-arylalkyl) or
two $R^L$ together represent $C_4$-$C_{18}$-alkandiyl, $C_4$-$C_{18}$-haloalkandiyl, $C_4$-$C_{18}$-alkanedioxy, $C_4$-$C_{18}$-haloalkanedioxy, $C_6$-$C_{14}$-aryldiyl, $C_7$-$C_{18}$-arylalkanediyl, $C_6$-$C_{14}$-aryldioxy, $C_7$-$C_{18}$-arylalkanedioxy, —O(C=O)—($C_1$-$C_{18}$-alkyl)-(C=O)O—, —O(C=O)—($C_6$-$C_{14}$-aryl)-(C=O)O— and —O(C=O)—($C_7$-$C_{18}$-arylalkyl)-(C=O)O—, or oxo (=O)

In one embodiment r is 0.
For this embodiment examples for such compounds include for
z=2 tin dichloride or in another embodiment tin dichloride, zinc dichloride, iron dichloride and manganese dichloride
z=3 aluminum trichloride, aluminum tribromide, boron trifluoride, boron trichloride, boron tribromide, gallium trichloride, indium trifluoride, scandium trichloride, iron trichloride, arsenic trifluoride, bismuth trichloride.
z=4 titanium tetrachloride, titanium tetrabromide, vanadium tetrachloride, tin tetrachloride, zirconium tetrachloride, hafnium tetrachloride titanium bromide trichloride, titanium dibromide dichloride, vanadium bromide trichloride, and tin chloride trifluoride.
z=5 antimony pentachloride, antimony pentafluoride, arsenic pentafluoride, antimony chloride pentafluoride and arsenic fluoride tetrachloride Preferred compounds are zinc dichloride, iron dichloride, manganese dichloride, aluminum trichloride and boron trifluoride, whereby aluminum trichloride and boron trifluoride are preferred.

Those skilled in the art are aware of the fact that lewis acids are often supplied or available in form of adducts with weak lewis bases, in particular ethers. Examples thereof include boron trifluoride diethyletherate or tetrahydrofuranate. Such derivatives shall be encompassed by the mere description of the Lewis acids as well.

In one embodiment r is 1, 2 or 3.
For this embodiment examples for such compounds include for
z=3 methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, methoxyaluminum dichloride, ethoxyaluminum dichloride, 2,6-di-tert-butylphenoxyaluminum dichloride, methoxy methylaluminum chloride, 2,6-di-tert-butylphenoxy methylaluminum chloride, isopropoxygallium dichloride and phenoxy methylindium fluoride, acetoxyaluminum dichloride, benzoyloxyaluminum dibromide, benzoyloxygallium difluoride, methyl acetoxyaluminum chloride, and isopropoyloxyindium trichloride and in one embodiment additionally triphenylboron.
z=4 cyclopentadienyltitaniumtrichloride, dicyclopentadienyltitaniumdichloride, cyclopentadienylzirconiumtrichloride and dicyclopentadienylzirconiumdichloride
z=5 tetraphenylantimony chloride and triphenylantimony dichloride and vanadium oxytrichloride.

In one embodiment two or more Lewis acids are employed for example two or three.

As a consequence q-valent Lewis Acids Fragments (LAF) are formally cationic structural units formally obtainable by removing q formally anionic substituents from a lewis acid. It is apparent for those skilled in the art and understood that depending on the lewis acid employed q is an integer of 1 up to the respective z.

For methyl aluminoxane q is at maximum 3.
Preferred Lewis Acids Fragments (LAF) are structural units of formula (IVa)

$$MR^L{}_{(rr)}X_{(zz-rr)} \qquad (IVa)$$

wherein
M, X and $R^L$ shall have the same meaning including their areas of preference as described for formula (IV) above
zz is (z-q) with q being an integer of 1 up to z, wherein z shall have the same meaning including its areas of preference as described for formula (IV) above and
rr is 0 or an integer of at maximum zz, preferably 0, 1 or 2, more preferably 0 or 1 and even more preferably 0.

Preferred Lewis Acid Fragments (LAF) are for q=1 (monovalent): dichloroaluminyl $AlCl_2$ and difluoroboryl $BF_2$.

for q=2 (divalent): chloroaluminyl AlCl and fluoroboryl BF and for q=3 (trivalent): aluminum Al.

Those skilled in the art are aware of the fact that the Lewis Acid Fragments (LAF) are formally q-times positively charged and that for example in compounds of formula (Ia) the residue $P(OCR^2)_2$ is formally anionic with the negative charge being delocated over the five-membered O—C—P—C—O unit. For reasons of consistency with their analogues having a covalent P—H or P—Si bond instead of an ionic one formulae (I), (Ia) and (IVa) do not specifically indicate the charge distribution or existence.

The process is typically carried out by combining the compounds of formulae (II) and (III) and the at least one Lewis acid either neat or dissolved or suspended in a solvent. Thereby a reaction mixture is formed.

Alternatively the process is carried out by adding the at least one Lewis acid and then the compound of formula (II) either neat or dissolved or suspended in a solvent to a neat compound of formula (III) or a solution or suspension thereof. Thereby a reaction mixture is formed.

The reaction time is typically in the range of from 2 min to 72 hours, preferably 30 min to 24 hours.

Suitable solvents include and preferably are those which do not or virtually not react under formation of new covalent bonds with the compounds of formulae (I), (II) and (III).

Such solvents include
- aromatic hydrocarbons and halogenated aromatic hydrocarbons, such as mesitylene, chlorobenzene and dichlorobenzenes,
- ethers such as diethylether, methyl tert.butyl ether, tetrahydrofurane, dioxane, dimethoxyethane, diethoxyethan and higher glycolethers;
- amides such as dimethylformamide,
- sulfones such as tetraethylensulfone,
- liquid sulfur dioxide and liquid carbon dioxide
- aliphatic hydrocarbons such as pentane, hexane, cyclohexane, methylcyclohexane and
- halogenated aliphatic or olefinic hydrocarbons such as methylchloride, dimethylchloride, chloroform, trichloroethane and tetrachloroethene and mixtures of the aforementioned solvents.

Preferred solvents are halogenated aliphatic hydrocarbons such as methylchloride, dimethylchloride, chloroform, trichloroethane and tetrachloroethene.

Those skilled in the art are aware that the selection of a suitable solvent depends inter alia from the solubility and reactivity of the lewis acid(s) employed.

The amount of solvent is not critical at all and is just limited by commercial aspects, since they have to be removed if the compounds of formula (I) shall finally be isolated.

To facilitate the reaction, mixing energy e.g. by standard agitators stirrers and/or static mixing elements is introduced into the reaction mixture.

Even though not necessary, mixing can also be supported by using high force dispersion devices such as, for example, ultrasound sonotrodes or high pressure homogenizers.

The process may either be performed batchwise or continuously.

A typical and preferred reaction temperature range to carry out the process is from −30° C. to 120° C., preferably from −10 to 80° C. and even more preferably from 0 to 40° C.

It is evident to those skilled in the art, that where the desired reaction temperature is above the boiling point at 1013 hPa of the solvent employed, the reaction is carried out under sufficient pressure.

A typical and preferred reaction pressure range to carry out the process is from 50 hPa to 10 MPa, preferably from 500 hPa to 1 MPa.

Where phosphine ($PH_3$) is employed as compound of formula (II) the preferred reaction pressure range to carry out the process is from 800 hPa to 10 MPa, preferably from 1000 hPa to 6 MPa, even more preferably from 1000 hPa to 0.5 MPa.

In one embodiment the reaction is carried out under substantial exclusion of oxygen i.e. an oxygen partial pressure of less than 10 hPa, preferably less than 5 hPa and more preferably less than 0.15 hPa.

A typical and preferred reaction pressure range to carry out the process is from 50 hPa to 10 MPa, preferably from 500 hPa to 1 MPa.

In one embodiment the reaction is carried out under an inert gas i.e. a gas that does not or virtually not react with the reactants under the reaction conditions employed.

During the reaction compounds of formula (I) are formed.

The molar ratio of compounds of formula (II) to (III) employed in the reaction depends on the integer m, i.e. the number of acyl groups to be finally present in compounds of formula (I). Typically from 0.8 to 1.2 mol of compounds of formula (III) are employed per acyl group to be introduced, preferably 0.9 to 1.0 mol.

It is known to those skilled in the art that depending on the ratio molar ratio of compounds of formula (II) to (III) employed in the reaction mixtures of compounds of formula (I) with a varying number of acyl groups m will be obtained.

The molar ratio of compounds of formula (III) and lewis acid employed in the reaction is typically from 0.01 to 1 mol of lewis acid per mol of compound of formula (III), preferably 0.05 to 1.0 mol, even more preferably 0.05 to 0.5 mol.

In a particularly preferred embodiment in the process according to the invention compounds of formula Id) are prepared

wherein

[LAF] represents a lewis acid fragment as defined in formula (IVa) above including its areas of preference at any level $R^H$ is hydrogen $R^2$ is $C_6$-$C_{14}$-aryl, more preferably phenyl, mesityl or 2,6-dimethoxyphenyl or naphthyl, and even more preferably phenyl or mesityl or naphthyl, whereby phenyl or mesityl are even more preferred.

s is either 0 or, provided that m is 0 and p is 2, s is 1 q if s is 0, is 1 and if s is 1, is an integer of 1, 2 or 3, more preferably 1 or 3 m and p are selected such that:

m is zero or 1 or 2 p is 1 or 2 and the following condition is met:

(m+p) is 3 where s is 0

(m+p) is 2 where s is 1 by reacting phosphine ($PH_3$) with compounds of formula (III)

wherein $R^2$ is as defined above and

Hal represents fluoro, chloro, bromo or iodo, preferably chloro or bromo and even more preferably chloro whereby the reaction is carried out in the presence of at least one lewis acid of formula (IV) as defined above including its areas of preference at any level.

It was found that where phosphine (PH$_3$) is employed, with increasing amounts of Lewis acid compounds of formula (Ia) may be formed as major product.

The compounds of formula (Ia) are novel with the exception of the following compounds:
1) diphenylboryldipivaloylphosphide since this compound is known from A. S. Ionkin, L. F. Chertanova, B. A. Arbuzov, Phosphorus, Sulfur and Silicon and the Related Elements 1991, 55, 133-136.
2) 1-oxa-3-oxonia-5λ$^3$-phospha-2-borata-4,6-dimethylcyclohexadiene and 1-oxa-3-oxonia-5λ$^3$-phospha-2-borata-4,6-diphenylcyclohexadiene since these compounds are known from H. Noth, S. Staude, M. Thomann, J. Kroner, R. T. Paine, *Chem. Ber.* 1994, 127, 1923-1926:

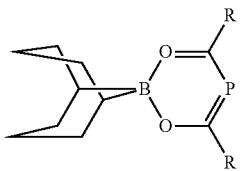

with R=methyl or phenyl

The preferred substitution pattern disclosed above for compounds of formula (I), the LAFs and R$^2$ is likewise applicable here.

As shown for two of the excluded compounds above and as confirmed by the inventors of the present invention the structure of compounds of formula (Ia) e.g. for q=1 is best illustrated by the following general formula (Ib) and its mesomeric analogues:

Simply for avoidance of doubt these structures shall of course be encompassed by the more general formula (Ia).

Specific examples of compounds of formulae (I) and (Ia) are dichloroaluminyl-bismesitoylphosphide, chloroaluminyl-bis(bismesitoylphosphide), chloroaluminyl difluoroboryl-bismesitoylphosphide-bis(bisbenzoylphosphide), chloroboryl-bis(bismesitoylphosphide), chloroboryl-bis(bisbenzoylphosphide), aluminium-tris(bismesitoylphosphide) aluminium-tris(bisnaphthoylphosphide) and aluminium-tris(bisbenzoylphosphide), whereby difluoroboryl-bismesitoylphosphide, aluminium-tris(bismesitoylphosphide) and aluminium-tris(bisbenzoylphosphide) are preferred.

Compounds of formula (Ia) may be converted to compounds where the LAF is replaced by hydrogen.

Therefore, the invention further encompasses a process for preparing compounds of formula (Ib)

by reacting compounds of formula (Ia) with a proton source.

In one embodiment proton sources include water, acids and alcohols or a mixture thereof. Suitable acids include those having a pKa of 7 or less, preferably 5 or less, more preferably 2 or less at 25° C. and measured in water.

Examples of suitable acids include hydrogen chloride in water or in diethylether, sulphuric acid, carboxylic acids such as formic acid, acetic acid and citric acid and Alcohols such as ethyleneglycol.

In one embodiment water is employed for the aforementioned conversion. In another embodiment toluene is employed for the aforementioned conversion.

The amount of the proton source is not critical and might be in the range of from 0.1 to 100 mol equivalents with respect to the compounds of formula (I), preferably in the range of from 0.9 to 1.2 mol equivalents.

Compounds or formula (I) and in particular those wherein x=1 or those of formula (Ia) and (Ib) are useful as precursor materials for substituted bisacylphosphine oxides, whether polymeric or not, which are versatile photoinitiators.

Such bisacylphosphine oxides be obtained by reaction of compounds of formula (I) in a manner known per se in the art and disclosed for example in WO2006/056541 and WO2014/053455 which are herein incorporated by reference in their entirety.

Thus, compounds of formula (I) and (Ia) and (Ib) are particularly useful as precursors for photoinitiators. Therefore, one further aspect of the invention relates to the use of compounds of formula (I) or (Ia) or (Ib) in a process for the preparation of photoinitiators.

Another aspect of the invention relates to a process for preparing bisacylphosphinoxides comprising the process for preparing compounds of formula (I) and optionally (Ib) as disclosed above.

The invention is further illustrated by the examples without being limited thereby.

EXAMPLES

I Materials and Methods

All reactions were carried out under argon using either standard Schlenk techniques or an argon-filled glove box. Solvents were purified using an Innovative Technology PureSolv MD 7 solvent purification system. All reagents were used as received from commercial suppliers unless otherwise stated. The compounds Na$_3$P$_7$ and (Me$_3$Si)$_3$P$_7$ were synthesized following literature procedures, e.g. M. Cicač-Hudi, J. Bender, S. H. Schlindwein, M. Bispinghoff, M. Nieger, H. Grützmacher, D. Gudat, *Eur. J. Inorg. Chem.* 2015, 5, 649. X-ray single crystal diffraction studies were performed on an Oxford XCalibur S diffractometer equipped with a molybdenum X-ray tube (λ=0.7107 Å).

II General Methods for the Preparation of Acylphosphines

Example 1a Acylation of PH$_3$ with Mesitoyl Chloride in the Presence of BF$_3$.Et$_2$O A 100 mL two neck round bottom flask containing mesitoylchloride (MesCOCl) (4 mL, 24 mmol, 1 eq.) and boron trifluoride etherate (BF$_3$.Et$_2$O) (0.15 mL, 1.2 mmol, 0.05 eq.) in dichloromethane (DCM) (20 mL) was connected via one neck to the PH$_3$ supply and via the other neck to a bleach scrubber. The flask was flushed with PH$_3$, then the stopcock to the bleach scrubber was closed and the system pressurized with 50 kPa $PH_3$. Typically, the $PH_3$ consumption was finished after 3 to 6 hours. The flask was stirred for another 12 h at 20° C. Then the system was opened to the bleach scrubber and flushed with argon for 30 min to remove all traces of $PH_3$. The crude reaction mixture was analyzed by $^{31}$P-NMR spectroscopy. Based on the integrals of the NMR signals, the mixture was found to contain 70% bis(mesitoylphosphine) $HP(COMes)_2$ [$\delta(^{31}P)$=89.2 (s, enol), 2.2 (d, $^1J_{PH}$=246.8 Hz, keto) ppm], 16% difluoroborylbis(mesitoylphosphide) $[BF_2]P(COMes)_2$ [$\delta(^{31}P)$=93.4 (s) ppm] and 14% mono(mesitoylphosphine) $H_2P(COMes)$ [$\delta(^{31}P)$=−97.4 (t, $^1J_{PH}$=218.3 Hz) ppm]. MesCOCl (0.33 mL, 2.0 mmol) and $BF_3.Et_2O$ (0.013 mL, 0.10 mmol) were again added and the mixture stirred for another 60 min. Subsequently, the mixture was analyzed by $^{31}$P-NMR spectroscopy and found to contain 76% $HP(COMes)_2$ and 16% $[BF_2]P(COMes)_2$. Degassed water (25 mL) was added and the suspension stirred for 24 h at 20° C. The aqueous phase was extracted with DCM (3×5 mL). The solvent was removed under reduced pressure from the combined organic phases, yielding $HP(COMes)_2$ as a bright yellow crystalline solid. The analytical data corresponded to published data.

Example 1b Acylation of $PH_3$ with Mesitoyl Chloride in the Presence of $BF_3.Et_2O$ A steel autoclave fitted with a 100 mL ceramic cell containing mesitoylchloride (MesCOCl) (4 mL, 24 mmol, 1 eq.) and boron trifluoride etherate ($BF_3.Et_2O$) (0.15 mL, 1.2 mmol, 0.05 eq.) in dichloromethane (DCM) (20 mL) was connected via an inlet to the $PH_3$ supply and via an outlet to to a bleach scrubber. The autoclave was flushed with $PH_3$ and then the valve to the bleach scrubber was closed and the system pressurized with 250 kPa $PH_3$. Typically, the $PH_3$ consumption was finished after 3 to 6 hours. The flask was stirred for another 12 h at 20° C. Then the system was opened to the bleach scrubber and flushed with argon for 30 min to remove all traces of $PH_3$. The crude reaction mixture was analyzed by $^{31}$P-NMR spectroscopy. Based on the integrals of the NMR signals, the mixture was found to be substantially identical to the one obtained in example 1a).

Example 2 Acylation of $(Me_3Si)_3P_7$ with Mesitoyl Chloride in the Presence of $BF_3.Et_2O$ To a solution of MesCOCl (2.48 mL, 15 mmol, 6 eq.) and $BF_3.Et_2O$ (0.95 mL, 7.5 mmol, 3 eq.) in DCM (10 mL) was added solid tris(trimethylsilyl) heptaphosphide $(Me_3Si)_3P_7$ (1.09 g, 2.5 mmol, 1 eq.). The orange solution was stirred for 16 h and the solvent removed under reduced pressure to obtain $(MesCO)_3P_7$ as a bright yellow solid (1.63 g, 2.48 mmol, 99%). An analytically pure sample could be obtained by layering a saturated THF solution with hexane, collecting the yellow crystalline on a glass frit and drying it under reduced pressure.

Mp 198-199° C. (from THF). Analysis Found: C, 55.7; H, 5.5; N, 0.2. Calc. for $C_{30}H_{33}O_3P_7$: C, 54.7; H, 5.1; N, 0.0. $^1$H-NMR (300 MHz, $CD_2Cl_2$): $\delta$=6.85 (s, 6H, Ar), 2.30 (s, 9H, $CH_3$), 2.24 (s, 18H, $CH_3$) ppm. $^{31}$P-NMR (CDCl$_3$, 121 MHz): $\delta$=135.0 to 122.0 (m, 3P), −140.0 to −151.0 (m, 1P), −148.5 to −159.5 (m, 3P) ppm.

Example 3 Acylation of $PH_3$ with Mesitoyl Chloride in the Presence of $AlCl_3$ Yielding Aluminum tris[bis(mesitoyl)phosphide][Al($^{Mes}$BAP)$_3$]

A 100 mL round bottom flask with two Normag spindle valves was charged with MesCOCl (6 eq., 90 mmol, 15.0 mL), $AlCl_3$ (1 eq., 15 mmol, 2.00 g) and tetrachloroethene $C_2Cl_4$ (35 mL). One side of the flask was connected to a $PH_3$ gas bottle and the other side to a series of three bleach bathes. The system was purged with argon for 15 min to remove traces of oxygen. Then it was pressurized with 80 kPa $PH_3$ under vigorous stirring. An incipient pressure drop was followed by a pressure rise to about 120 kPa due to the formation of HCl as by-product. The system was opened to the bleach bath and pressurized with $PH_3$ again. This procedure was repeated several times until the pressure remained stable. The orange suspension was stirred for another 16 h under 80 kPa $PH_3$ pressure, before it was opened to the bleach bath and purged with argon for 60 min. The suspension was transferred to a 100 mL round bottom Schlenk flask and the solvent removed to a minimum under reduced pressure. Precipitation of the product was completed by addition of n-hexane (50 mL). The product was collected on a G3 glass frit, washed with n-hexane (3×10 mL) and dried under reduced pressure, yielding the aluminum complex [Al($^{Mes}$BAP)$_3$] as a bright orange powder (14.0 g, 14.0 mmol, 93%).

Mp 137-139° C. $^1$H-NMR (300 MHz, CDCl$_3$): $\delta$=6.73 (s, 12H, Ar), 2.24 (s, 18H, $CH_3$), 2.15 (s, 36H, $CH_3$) ppm. $^{13}$C{$^1$H}-NMR (75 MHz, CDCl$_3$): $\delta$=229.0 (d, $^1J_{PC}$=88.2 Hz, C(O)P), 140.0 (d, $^2J_{PC}$=27.9 Hz, $C_{ipso}$), 138.4 (s, $C_{para}$), 134.0 (d, $C_{ortho}$), 128.3 (s, $C_{meta}$), 21.2 (s, $CH_3$), 19.6 (s, $CH_3$) ppm. $^{31}$P-NMR (CDCl$_3$, 121 MHz): $\delta$=99.0 (s) ppm.

Example 4 Acylation of $PH_3$ with Benzoyl Chloride in the Presence of $AlCl_3$ Yielding Aluminum tris[bis(benzoyl)phosphide] [Al($^{Ph}$BAP)$_3$]

A 100 mL round bottom flask with two Normag spindle valves was charged with benzoylchloride (PhCOCl, 6 eq., 17.4 mmol, 2.00 mL), $AlCl_3$ (1 eq., 2.90 mmol, 290 mg) and tetrachloroethene $C_2Cl_4$ (10 mL). Reaction and work-up were carried out as described above, yielding the aluminum complex [Al($^{Ph}$BAP)$_3$] as a bright red powder (1.35 g, 1.80 mmol, 62%).

$^{31}$P-NMR (CDCl$_3$, 121 MHz): $\delta$=68.7 (s) ppm.

Example 5 Synthesis of bis(mesitoyl)phosphine $HP(COMes)_2$ from [Al($^{Mes}$BAP)$_3$]

A suspension of the aluminum complex [Al($^{Mes}$BAP)$_3$] prepared according to example 3 (1 eq, 0.100 mmol, 100 mg) and citric acid (2 eq., 0.200 mmol, 38 mg) in toluene (2.0 mL) was refluxed for 6 hours. The resulting yellow suspension was filtered over a G3 glass frit and the solvent of the filtrate removed under reduced pressure, yielding bis(mesitoyl)phosphine $HP(COMes)_2$ as a bright yellow powder (90 mg, 0.275 mmol, 92%).

$^1$H-NMR (300 MHz, $C_6D_6$): $\delta$=19.3 (d, $^3J_{PH}$=2.0 Hz, OHO), 6.63 (s, Ar), 6.63 (s, Ar), 5.44 (d, $^1J_{PH}$=244.2 Hz, PH), 2.34 (s, $CH_3$), 2.18 (s, $CH_3$), 2.03 (s, $CH_3$), 2.00 (s, $CH_3$) ppm. $^{31}$P-NMR (CDCl$_3$, 121 MHz): $\delta$=90.2 (s, enol), 3.8 (d, $^1J_{PH}$=243.6 Hz, keto) ppm.

Example 6 Synthesis of bis(benzoyl)phosphine $HP(COPh)_2$ from [Al($^{Ph}$BAP)$_3$]

A suspension of the aluminum complex [Al($^{Ph}$BAP)$_3$] (1 eq, 0.100 mmol, 75 mg) prepared according to example 4 and citric acid (2 eq., 0.200 mmol, 38 mg) in toluene (2.0 mL) was refluxed for 2.5 hours. The resulting orange suspension was filtered over a G3 glass frit and the solvent of the filtrate removed under reduced pressure, yielding bis(benzoyl)phosphine HP(COPh)$_2$ as a bright orange powder (70 mg, 0.289 mmol, 96%).

$^1$H-NMR (300 MHz, C$_6$D$_6$): δ=20.1 (d, $^3J_{PH}$=3.1 Hz, OHO), 8.20-8.10 (s, 4H, Ar), 7.12-6.95 (s, 6H, Ar) ppm. $^{13}$C{$^1$H}-NMR (75 MHz, C$_6$D$_6$): δ=228.3 (d, $^1J_{PC}$=86.1 Hz, C(O)P), 140.1 (d, $^2J_{PC}$=26.7 Hz, C$_{ipso}$), 144.0 (d, $^5J_{PC}$=2.8 Hz, C$_{para}$), 128.9 (s, C$_{meta}$), 126.5 (d, $^3J_{PC}$=16.7 Hz, C$_{ortho}$) ppm. $^{31}$P-NMR (CDCl$_3$, 121 MHz): δ=90.2 (s, enol), 3.8 (d, $^1J_{PH}$=243.6 Hz, keto) ppm.

Example 7a Synthesis of difluoroboryl-bismesitoylphosphide [BF$_2$($^{Mes}$BAP)] from PH$_3$ A 100 mL two neck round-bottom flask containing mesitoylchloride (MesCOCl) (5.0 mL, 30 mmol, 1 eq.) and boron trifluoride diethyl etherate (BF$_3$.Et$_2$O, 2.38 mL, 18.8 mmol, 1 eq.) in C$_2$Cl$_4$ (20 mL) was exposed to 800 hPa PH$_3$ for 48 h. After purging the system, the orange suspension was transferred to a Schlenk flask with, the solvent evaporated to a minimum and precipitation of the product completed by addition of n-hexane (40 mL). The product was collected on a glass frit, washed with n-hexane (3×5 mL) and dried under reduced pressure, yielding the boron complex difluoroboryl-bismesitoylphosphide [BF$_2$($^{Mes}$BAP)] as a yellow solid (3.90 g, 10.4 mmol, 69%). Single crystals were obtained from toluene at −30° C.

$^1$H-NMR (300 MHz, CDCl$_3$): δ=6.93 (s, 3H, Mes-H), 2.37 (s, 12H, CH$_3$), 2.32 (s, 6H, CH$_3$) ppm. $^{13}$C{$^1$H}-NMR (300 MHz, CDCl$_3$): δ=237.7 (dt, $^1J_{PC}$=95.0, $^3J_{BC}$=2.2 Hz, C(O)P), 141.6 (d, J=1.4 Hz, p-Mes), 135.4 (d, $^3J_{PC}$=3.7 Hz, o-Mes), 135.3 (d, $^2J_{PC}$=21.2 Hz, ipso-Mes), 129.4 (s, m-Mes), 21.3 (s, p-CH$_3$), 20.1 (d, $^4J_{PC}$=3.8 Hz, o-CH$_3$) ppm. $^{31}$P-NMR (121 MHz, CDCl$_3$): δ=94.3 (s) ppm.

Example 7b Synthesis of bis(mesitoyl)phosphine HP(COMes)$_2$ from difluoroboryl-bismesitoylphosphide [BF$_2$($^{Mes}$BAP)]

A solution of the boron complex [BF$_2$($^{Mes}$BAP)] (1.33 g, 3.55 mmol) in THF (15 mL) and water (2 mL) was stirred for 15 min at 20° C. Volatiles were removed from the bright yellow solution under reduced pressure, yielding the phosphine $^{Mes}$BAP-H as a bright yellow powder (1.16 g, 3.55 mmol, 100%).

Example 8 Acylation of PH$_3$ with neat mesitoyl chloride in the presence of AlCl$_3$ Yielding Aluminum tris [bis(mesitoyl)phosphide] [Al($^{Mes}$BAP)$_3$]

A 100 mL round-bottom flask with two Normag spindle valves was charged with mesitoylchloride (10.0 mL, 60.0 mmol, 4 eq.) and AlCl$_3$ (333 mg, 2.50 mmol, 1 eq.). The reaction and the workup were carried out as described in example 3, yielding the aluminum complex [Al($^{Mes}$BAP)$_3$] as a bright orange powder (2.38 g, 2.37 mmol, 95%, corresponding to AlCl$_3$)

$^1$H-NMR (300 MHz, CDCl$_3$): δ=6.75 (s, 12H, Mes-H), 2.25 (s, 18H, CH$_3$), 2.17 (s, 36H, CH$_3$) ppm.
$^{13}$C{$^1$H}-NMR (75 MHz, CDCl$_3$): δ=240.3 (d, $^1J_{PC}$=92.2 Hz, C(O)P), 140.0 (d, $^2J_{PC}$=28.0 Hz, ipso-Mes, 138.4 (d, $^5J_{PC}$=1.3 Hz, p-Mes), 134.0 (d, $^3J_{PC}$=3.0 Hz, o-Mes), 128.3 (s, m-Mes), 21.2 (s, p-CH$_3$), 19.6 (d, $^4J_{PC}$=2.7 Hz, o-CH$_3$) ppm.
$^{31}$P-NMR (121 MHz, CDCl$_3$): δ=99.0 (s) ppm.
Analysis Found C, 71.0; H, 6.7; N, 0.1. Calc. for C$_{60}$H$_{66}$O$_6$P$_3$Al: C, 71.8; H, 6.6; N, 0. Mp>180° C. (decomposition, from toluene).

Example 9 Acylation of PH$_3$ with 1-naphthoyl Chloride in the Presence of AlCl$_3$ Yielding Aluminum tris [bis(naphthoyl)phosphide] [Al($^{Naph}$BAP)$_3$]

A thick walled 100 mL round bottomed flask with two Normag taps was charged with anhydrous AlCl$_3$ (333 mg, 2.5 mmol) in a glovebox. To this 1-naphthoyl chloride (2.26 mL, 15 mmol) and C$_2$Cl$_4$ (10 mL) were added. The mixture was placed under 1 bar Ar to check for leaks. The mixture was then stirred for 30 minutes, and a pale yellow solution formed. The Ar pressure was released and the flask repressurised with 800 hPa PH$_3$, an orange colour was immediately observed. After 1 hour the atmosphere was replaced with fresh PH$_3$ to remove any HCl formed. The mixture was vigorously stirred over the weekend (3 nights) and turned bright orange, with the formation of a bright orange precipitate. A $^{31}$P NMR spectrum showed the solution to be complete. The reaction mixture was then transferred into a Schlenk flask with THF (40 mL). The solution was concentrated to approximately 10 mL and then hexane (20 mL) added to complete the precipitation. This was then filtered under Ar and the solid washed with a hexane (20 mL). The solid was dried on the frit under vacuum and collected to yield Al($^{Naph}$BAP)$_3$ as a bright orange solid (1.947 g, 74%).

Example 10 Acylation of PH$_3$ with Mesitoyl Chloride in the Presence of ZnCl$_2$ A thick walled 100 mL round bottomed flask with two Normag taps was charged with anhydrous ZnCl$_2$ (340.7 mg, 2.5 mmol) in a glovebox. To this mesitoyl chloride (1.66 mL, 10 mmol) and C$_2$Cl$_4$ (10 mL) were added. The mixture was placed under 1 bar Ar and then stirred for 15 minutes, and a pale yellow colour observed with partial dissolving of the ZnCl$_2$. The Ar pressure was released and the flask repressurised with 800 hPa PH$_3$. After 1 hour the atmosphere was replaced with fresh PH$_3$ to remove any HCl formed. The mixture was vigorously stirred overnight and turned a darker yellow, and some yellow precipitate was observed on the flask walls. A $^{31}$P NMR spectrum showed the solution to contain both HP(COMes)$_2$ and H$_2$P(COMes) in a ratio of approximately 1:1. The reaction mixture was again pressurised with PH$_3$ and left over the weekend (3 nights), the $^{31}$P NMR now showed approximately 90% HP(COMes)$_2$. The reaction mixture was then transferred into a Schlenk flask with THF (20 mL). The solution was concentrated to approximately 10 mL and then hexane (10 mL) added to complete the precipitation. This was then filtered under Ar and the filtrate then dried under vacuum to yield a sticky yellow solid (1.55 g). This was then washed with dry hexane (5 mL) to yield a yellow powder, the supernatant was removed by cannula filtration and the powder dried to yield HP(COMes)$_2$ (0.872 g, 2.67 mmol, 53%).

Example 11 Acylation of PH$_3$ with Naphthoyl Chloride (NaphCOCl) in the Presence of ZnCl$_2$ A thick walled 100 mL round bottomed flask with two Normag taps was charged with anhydrous ZnCl$_2$ (340.7 mg, 2.5 mmol) in a glovebox. To this 1-naphthoyl chloride (1.5 mL, 10 mmol) and $C_2Cl_4$ (10 mL) were added. The mixture was placed under 1 bar Ar and then stirred for 30 minutes, and a pale yellow colour was observed with partial dissolving of the $ZnCl_2$. The Ar pressure was released and the flask repressurised with 800 hPa $PH_3$, and an orange colour was immediately observed. After 1 hour the atmosphere was replaced with fresh $PH_3$ to remove any HCl formed. The mixture was vigorously stirred over the weekend (3 nights) and turned bright orange, with a bright orange precipitate observed. A $^{31}P$ NMR spectrum showed the solution to contain both $HP(CONaph)_2$ and $H_2P(CONaph)$ in a ratio of approximately 1:1. The reaction mixture was then left to stir under Ar for a further 2 days and no $H_2P(CONaph)$ was visible in the $^{31}P$ NMR spectrum. The reaction mixture was then transferred into a Schlenk flask with Toluene (20 mL) and THF (5 mL). The solution was concentrated to approximately 10 mL and then hexane (10 mL) added to complete the precipitation. This was then filtered under Ar and the filtrate then dried under vacuum to yield a sticky orange product. This was then dissolved in dry hexane (40 mL) and filtered, the hexane was removed under vacuum to yield a bright orange oil.

Example 12 Acylation of $PH_3$ with Naphthoyl Chloride (NaphCOCl) in the Presence of $TiCl_4$ $TiCl_4$ (1 M in Tol, 2.5 mL, 2.5 mmol) was diluted with dry toluene (7.5 mL) in a thick walled 100 mL round bottomed flask with two Normag taps under Ar. To this 1-naphthoyl chloride (1.5 mL, 10 mmol) was added, the colour changed from a pale orange to a dark red. The mixture was placed under 1 bar Ar and then stirred for 15 minutes. The Ar pressure was released and the flask repressurised with 800 hPa $PH_3$. The atmosphere was exchanged with fresh $PH_3$ twice more; once after 1 hour and a second time after 2 hours. The reaction was stirred overnight, 16 hours. The colour changed from red to green/black in this time. When degassed water was added to the green/black solution, it turned orange and the formation of $HP(CONaph)_2$ was observed in $^{31}P$ NMR. When dry hexane was added to the solution, a bronze/red precipitate was obtained.

Example 13 Acylation of $PH_3$ with Mesitoyl Chloride in the Presence of $FeCl_3$ A thick walled 100 mL round bottomed flask with two Normag taps was charged with anhydrous $FeCl_3$ (406 mg, 2.5 mmol) in a glovebox. To this mesitoyl chloride (2.45 mL, 15 mmol) and $C_2Cl_4$ (10 mL) were added. The mixture was placed under 1 bar Ar and then stirred for 15 minutes, and a pale yellow solution was observed above a sticky brown solid. The Ar pressure was released and the flask repressurised with 800 hPa $PH_3$. After 1 hour the atmosphere was replaced with fresh $PH_3$ to remove any HCl formed, this was repeated once more. The mixture was vigorously stirred over a weekend. A $^{31}P$ NMR spectrum showed a multitude of peaks, including δ (ppm) 90.4 and −95.7 (t, $^1J_{PH}$=212 Hz) which are assignable to $HP(COMes)_2$ and $H_2P(COMes)$ respectively.

Example 14 Acylation of $PH_3$ with Mesitoyl Chloride in the Presence of $MnCl_2$ A thick walled 100 mL round bottomed flask with two Normag taps was charged with anhydrous $MnCl_2$ (315 mg, 2.5 mmol) in a glovebox. To this mesitoyl chloride (1.66 mL, 10 mmol) and toluene (10 mL) were added. The mixture was placed under 1 bar Ar and then stirred for 15 minutes, and a pale yellow solution was observed above a pinkish solid. The Ar pressure was released and the flask repressurised with 800 hPa $PH_3$. After 1 hour the atmosphere was replaced with fresh $PH_3$ to remove any HCl formed, this was repeated once more. The mixture was vigorously stirred for 20 hours. A $^{31}P$ NMR spectrum showed the presence of $HP(COMes)_2$ and $H_2P(COMes)$. The $MnCl_2$ was filtered off and the solvent of the filtrate was removed under vacuum to yield a sticky yellow solid. The solid was washed by adding hexane (1 mL) and stirring overnight. The yellow solid was then collected by filtration and dried under vacuum to yield $HP(COMes)_2$ (0.98 g, 3 mmol, 60%).

Example 15 Acylation of $PH_3$ with Mesitoyl Chloride in the Presence of $FeCl_2$ Example 15 was carried out as example 14 with the only difference being that $FeCl_2$ (318 mg, 2.5 mmol) was used instead of $MnCl_2$. $HP(COMes)_2$ was obtained in a yield of 58%.

Example 16 Acylation of $PH_3$ with Mesitoyl Chloride in the Presence of Methylaluminoxane (MAO)

To a solution of mesitoyl chloride (4.0 mL, 24 mmol) in dichloromethane (15 mL) was added a solution of methyl aluminumoxane in toluene (1.0 mL, 0.895 g mL$^{-1}$, 7 wt-% Al, 2.4 mmol Al, 0.1 eq.). The resulting dark orange solution was exposed to 800 hPa $PH_3$ for 48 h. The $^{31}$P-NMR spectrum showed a broad signal at δ=100 ppm, which can be assigned to a mixture of different Al-complexes of $HP(COMes)_2$. After addition of $H_2O_2$ (8.0 mL, 30 wt-%, 72 mmol, 3.0 eq.) at 0° C., a sharp signal at δ=−2 ppm was observed in the $^{31}$P-spectrum, which can be assigned to $(HO)OP(COMes)_2$.

The invention claimed is:
1. Compounds of formula (Ia)

$$[LAF][P(COR^2)_2]_q \quad \text{(Ia)}$$

wherein:
LAF represents a q-valent Lewis Acid Fragment (LAF) that is a cationic structural unit obtainable by removing q anionic substituents from a Lewis acid,
q is an integer of 1 to 5, and
$R^2$ is aryl or heterocyclyl alkyl or alkenyl
whereby the aforementioned alkyl and alkenyl substituent $R^2$ is
either not, once, twice or more than twice interrupted by non-successive functional groups selected from the group consisting of:
—O—, —NR$^4$—, —CO—, —OCO—, —O(CO) O—, NR$^4$(CO)—, —NR$^4$(CO)O—, O(CO) NR$^4$—, —NR$^4$(CO)NR$^4$—,
and
either not, additionally or alternatively either once, twice or more than twice interrupted by bivalent residues selected from the group consisting of heterocyclo-diyl, and aryldiyl,
and
either not, additionally or alternatively either once, twice or more than twice substituted by substituents selected from the group consisting of:

oxo, halogen, cyano, $C_6$-$C_{14}$-aryl; heterocyclyl, $C_1$-$C_8$-alkoxy, $C_1$-$C_8$-alkylthio, —$SO_2N(R^4)_2$, —$NR^4SO_2R^5$, —$N(R^4)_2$—, —$CO_2N(R^4)_2$, —$COR^4$—, $OCOR^5$, —$O(CO)OR^5$, $NR^4(CO)R^4$, —$NR^4(CO)OR^4$, $O(CO)N(R^4)_2$, —$NR^4(CO)N(R^4)_2$, whereby in all formulae where used $R^4$ is independently selected from the group consisting of hydrogen, $C_1$-$C_8$-alkyl, $C_6$-$C_{14}$-aryl, and heterocyclyl, or $N(R^4)_2$ as a whole is a N-containing heterocycle, and $R^5$ is independently selected from the group consisting of $C_1$-$C_8$-alkyl, $C_6$-$C_{14}$-aryl, and heterocyclyl, or $N(R^5)_2$ as a whole is a N-containing heterocycle, with the exception of diphenylboryldipivaloylphosphide and 1-oxa-3-oxonia-5λ$^3$-phospha-2-borata-4,6-dimethylcyclohexadiene and 1-oxa-3-oxonia-5λ$^3$-phospha-2-borata-4,6-diphenylcyclohexadiene:

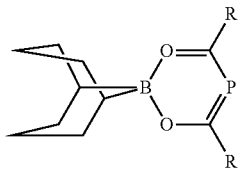

with R=methyl or phenyl.

2. Compounds according to claim 1, wherein
$R^2$ is $C_6$-$C_{14}$-aryl or $C_4$-$C_{13}$-heteroaryl.

3. Compounds according to claim 1, wherein
LAF is dichloroaluminyl ($AlCl_2$) or difluoroboryl ($BF_2$) with q being 1
chloroaluminyl (AlCl) or fluoroboryl (BF) with q being 2 or
aluminum (Al) or boron (B) with q being 3.

4. The following compounds of formula (Ia) according to claim 1:
dichloroaluminyl-bismesitoylphosphide, difluoroboryl-bismesitoylphosphide, dichloroaluminyl-bisbenzoylphosphide, difluoroboryl-bisbenzoylphosphide, chloroaluminyl-bis(bismesitoylphosphide), chloroaluminyl-bis(bisbenzoylphosphide), chloroboryl-bis(bismesitoylphosphide), chloroboryl-bis(bisbenzoyl-phosphide), aluminium-tris(bismesitoylphosphide), aluminium-tris(bisnaphthoylphosphide) and/or aluminium-tris(bisbenzoylphosphide).

5. Compounds according to claim 1, wherein LAF is obtainable from a Lewis acid selected from the group consisting of methyl aluminoxane (MAO) and compounds represented by formula (IV)

wherein
z is 2, 3, 4 or 5
r is 0 or an integer of at maximum z
M if z is 2 is an element selected from the group consisting of Sn, Zn, Fe, and Mn
if z is 3 is an element selected from the group consisting of Sc, Y, La, Ce, Pr, Nd, Sm, Eu, Gd, Tb, Dy, Ho, Er, Tm, Yb, Lu, Fe, B, Al, Ga, In, and As
if z is 4 is an element selected from the group consisting of V, Ti, Zr, Hf, and Sn
if z is 5 is an element selected from the group consisting of V, P, As, Sb, and Bi X is independently selected from the group consisting of fluoride, chloride, bromide, iodide, azide, isocyanate, thiocyanate, isothiocyanate, and cyanide $R^L$ represents $C_1$-$C_{18}$-alkyl, $C_1$-$C_{18}$-haloalkyl, $C_1$-$C_{18}$-alkoxy, $C_1$-$C_{18}$-haloalkoxy, $C_6$-$C_{14}$-aryl, $C_7$-$C_{18}$-arylalkyl, $C_6$-$C_{14}$-aryloxy, $C_7$-$C_{18}$-arylalkoxy, —O(HC=O), —O(C=O)—($C_1$-$C_{18}$-alkyl), —O(C=O)—($C_6$-$C_{14}$-aryl) or —O(C=O)—($C_7$-$C_{18}$-arylalkyl) or two $R^L$ together represent $C_4$-$C_{18}$-alkandiyl, $C_4$-$C_{18}$-haloalkandiyl, $C_4$-$C_{18}$-alkanedioxy, $C_4$-$C_{18}$-haloalkanedioxy, $C_6$-$C_{14}$-aryldiyl, $C_7$-$C_{18}$-arylalkanediyl, $C_4$-$C_{18}$-alkanedioxy, $C_4$-$C_{18}$-haloalkanedioxy, $C_6$-$C_{14}$-aryl)-(C=O)O—, ($C_1$-$C_{18}$-alkyl)-(C=O)O—, —O(C=O)—($C_6$-$C_{14}$-aryl)-(C=O)O—, —O(C=O)—($C_7$-$C_{18}$-arylalkyl)-(C=O)O—, or oxo (=O).

6. Compounds according to claim 5, wherein LAF is a structural unit of formula (IVa)

wherein
M, X and $R^L$ have the same meaning as described for formula (IV)
zz is (z-q) with q being an integer of 1 up to z, wherein z has the same meaning as described for formula (IV) and
rr is 0 or an integer of at maximum zz.

7. A process for the preparation of compounds of formula (I):

$$[LAF]_s[P_x(R^H)_m(R^1)_n(COR^2)_p]_q \qquad (I)$$

wherein
s is either 0 or, provided that x is 1, m and n are 0 and p is 2, s is 1
q if s is 0, is 1 and
if s is 1, is an integer of 1 to 5
x is an integer of 1 to 15 or 20
m, n and p are selected such that:
m is zero or an integer of 1 or more
n is zero or an integer of 1 or more
P is an integer of 1 or more
and one of the following conditions is met:

| If | | |
|---|---|---|
| | x is an integer of 1 to 9 | (m+n+p) is (x+2) where s is 0 |
| | | (m+n+p) is (x+1) where s is 1 |
| | x is an integer of 3 to 10 | (m+n+p) is x |
| | x is an integer of 4 to 12 | (m+n+p) is (x−2) |
| | x is an integer of 5 to 10 or 13 | (m+n+p) is (x−4) |
| | x is an integer of 7 to 14 | (n+m+p) is (x−6) |
| | x is 10, 11 or 15 | (m+n+p) is (x−8) |
| | x = is 12 or 20 | (m+n+p) is (x−10) |

LAF represents a q-valent Lewis Acid Fragment (LAF) that is a cationic structural unit obtainable by removing q anionic substituents from a Lewis acid, $R^H$ are independently of each other either
hydrogen,
or a residue of formula $Si(R^3)_3$, wherein the substituents $R^3$ are independently of each other selected from the group consisting of $C_1$-$C_{18}$-alkyl and $C_6$-$C_{14}$-aryl $R^1$ and $R^2$ are independently of each other aryl or heterocyclyl, alkyl or alkenyl
whereby the aforementioned alkyl and alkenyl substituents $R^1$ and/or $R^2$ are either not, once, twice or more than twice interrupted by non-successive functional groups selected from the group consisting of:
—O—, —NR$^4$—, —CO—, —OCO—, —O(CO) O—, NR$^4$(CO)—, —NR$^4$(CO)O—, O(CO) NR$^4$—, —NR$^4$(CO)NR$^4$—,
and
either not, additionally or alternatively either once, twice or more than twice interrupted by bivalent residues selected from the group consisting of heterocyclo-diyl, and aryldiyl,
and
either not, additionally or alternatively either once, twice or more than twice substituted by substituents selected from the group consisting of:
oxo, halogen, cyano, $C_6$-$C_{14}$-aryl; heterocyclyl, $C_1$-$C_8$-alkoxy, $C_1$-$C_8$-alkylthio, —SO$_2$N(R$^4$)$_2$, —NR$^4$SO$_2$R$^5$, —N(R$^4$)$_2$—, —CO$_2$N(R$^4$)$_2$, —COR$^4$—, —OCOR$^5$, —O(CO)OR$^5$, NR$^4$(CO) R$^4$, —NR$^4$(CO)OR$^4$, O(CO)N(R$^4$)$_2$, —NR$^4$(CO) N(R$^4$)$_2$,
whereby in all formulae where used
R$^4$ is independently selected from the group consisting of hydrogen, $C_1$-$C_8$-alkyl, $C_6$-$C_{14}$-aryl, and heterocyclyl or N(R$^4$)$_2$ as a whole is a N-containing heterocycle,
R$^5$ is independently selected from the group consisting of $C_1$-$C_8$-alkyl, $C_6$-$C_{14}$-aryl, and heterocyclyl or N(R$^5$)$_2$ as a whole is a N-containing heterocycle
the process comprising at least the step of reacting compounds of formula (II)

  (II)

wherein R$^H$, R$^1$, x, and n and the sum of (m+n+p) is as defined above for the sum of (m+n+p) for compounds of formula (I) with s being 0 where x=1
and the sum of (m+p) is an integer of 1 or more that fits the equation given for the sum of (m+n+p) for compounds of formula (I) with s being 0 where x is 1
with compounds of formula (III), R$^2$COHal    (III)

wherein R$^2$ is as defined above for compounds of formula (I) and
Hal represents fluoro, chloro, bromo or iodo
whereby the reaction is carried out in the presence of at least one Lewis acid.

8. The process according to claim 7, wherein in compounds of formulae (I) and (III)
R$^2$ is $C_6$-$C_{14}$-aryl or $C_4$-$C_{13}$-heteroaryl.

9. The process according to claim 7, wherein as compounds of formula (II) phosphine (PH3), tris(trimethylsilyl) phosphine (P(SiMe)3) or tris(trimethylsilyl)-heptaphosphine ((P7(SiMe)3) are employed.

10. The process according to claim 7, wherein as compounds of formula (I) benzoylphosphine, mesitoylphosphine, bismesitoylphosphine, dibenzoylphosphine dichloroaluminyl-bismesitoylphosphide, difluoroboryl-bismesitoylphosphide, dichloroaluminyl-bisbenzoylphosphide, difluoroboryl-bisbenzoylphosphide, chloroaluminyl-bis(bismesitoylphosphide), chloroaluminyl-bis(bisbenzoyl-phosphide), chloroboryl-bis(bismesitoylphosphide), chloroboryl-bis(bisbenzoyl-phosphide), aluminium-tris(bismesitoylphosphide), aluminium-tris(bisnaphthoylphosphide) and/or aluminium-tris(bisbenzoylphosphide) are prepared.

11. The process according to claim 7, wherein the at least one Lewis acid is selected from the group including methyl aluminoxane (MAO) and compounds represented by formula (IV)

  (IV)

wherein
z is 2, 3, 4 or 5
r is 0 or an integer of at maximum z
M if z is 2 is an element selected from the group consisting of Sn, Zn, Fe and Mn
   if z is 3 is an element selected from the group consisting of Sc, Y, La, Ce, Pr, Nd, Sm, Eu, Gd, Tb, Dy, Ho, Er, Tm, Yb, Lu, Fe, B, Al, Ga, In, As
   if z is 4 is an element selected from the group consisting of V, Ti, Zr, Hf, Sn
   if z is 5 is an element selected from the group consisting of V, P, As, Sb, Bi
X is independently selected from the group consisting of fluoride, chloride, bromide, iodide, azide, isocyanate, thiocyanate, isothiocyanate or cyanide
R$^L$ represents $C_1$-$C_{18}$-alkyl, $C_1$-$C_{18}$-halo alkyl, $C_1$-$C_{18}$-alkoxy, $C_1$-$C_{18}$-haloalkoxy, $C_1$-$C_{14}$-aryl, $C_7$-$C_{18}$ arylalkyl, $C_6$-$C_{14}$-aryloxy, $C_7$-$C_{18}$-arylalkoxy, —O(HC=O), —O(C=O)—($C_1$-$C_{18}$-alkyl), —O(C=O)—($C_6$-$C_{14}$-aryl) and —O(C=O)—($C_7$-$C_{18}$-arylalkyl) or
two R$^L$ together represent $C_4$-$C_{18}$-alkandiyl, $C_4$-$C_{18}$-haloalkandiyl, $C_4$-$C_{18}$-alkanedioxy, $C_4$-$C_{18}$-haloalkanedioxy, $C_6$-$C_{14}$-aryldiyl, $C_7$-$C_{18}$-arylalkanediyl, $C_6$-$C_{14}$-aryldioxy, $C_7$-$C_{18}$-arylalkanedioxy, —O(C=O)—($C_1$-$C_{18}$-alkyl)-(C=O)O—, —O(C=O)—($C_6$-$C_{14}$-aryl)-(C=O)O— and —O(C=O)—($C_7$-$C_{18}$-arylalkyl)-(C=O)O—, or oxo (=O).

12. The process according to claim 11, wherein the Lewis Acid Fragments (LAF) are structural units of formula (IVa)

  (IVa)

wherein
M, X and R$^L$ shall have the same meaning as described for formula (IV)
zz is (z-q) with q being an integer of 1 up to z, wherein z shall have the same meaning as described for formula (IV) and
rr is 0 or an integer of at maximum zz.

13. The process according to claim 7,
wherein the Lewis Acids are aluminum trichloride and/or boron trifluoride.

14. A process for preparing compounds of formula (Ib)

  (Ib)

by reacting compounds of formula (Ia) according to claim 1 with a proton source.

15. A process according to claim 14 wherein proton sources include water, acids and alcohols or a mixture thereof.

16. A method comprising reacting compounds of claim 1 as precursor materials for substituted bisacylphosphine oxides.

* * * * *